Aug. 20, 1968     W. LINET     3,398,246
BRAKE WEAR ALERT DEVICE
Filed June 29, 1966
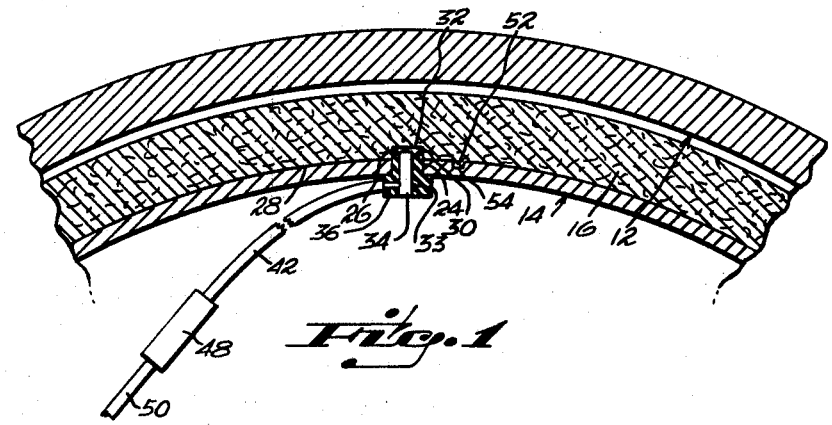
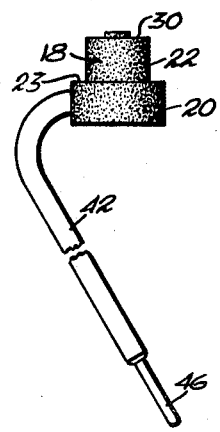
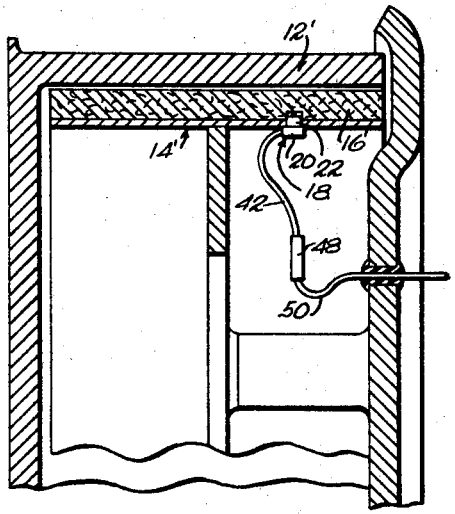
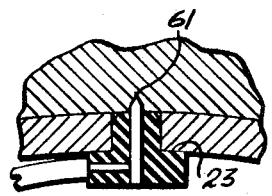
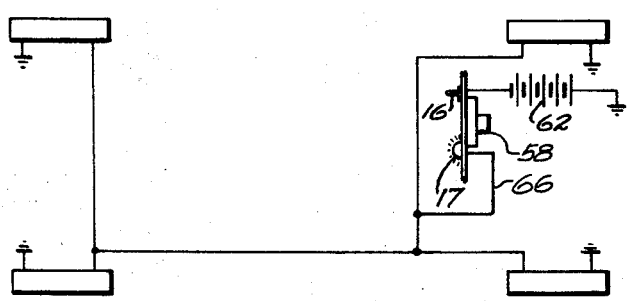
INVENTOR.
WILLIAM LINET
BY John Cyril Malloy
ATTORNEY.

3,398,246
BRAKE WEAR ALERT DEVICE
William Linet, 7700 SW. 134th St.,
Miami, Fla. 33156
Filed June 29, 1966, Ser. No. 561,596
9 Claims. (Cl. 200—61.4)

This invention relates to a brake wear alert device and, more particularly, to an electrical system to provide a warning in the cab of a vehicle when the brake lining has reached a predetermined condition of wear.

In the past, there have been numerous devices which have been employed for inclusion in the brake systems of automobiles such as that disclosed in U.S. Letters Patent No. 2,217,176. The instant invention is of an improved brake wear indicating device.

It is, accordingly, an object of this invention to provide a brake wear alert device which includes a warning indicator means in the cab of the vehicle and a normally opened switch incorporated in the braking system of the vehicle and conductor means to connect the switch and light in series with the source, the said switch comprising a conductive pin imbedded in a plug carried in the brake shoe and projecting into a recess in the brake lining with the distal end of the pin being spaced apart from the floor of the recess and the plug being headed and including a stem of a length such that when the head engages the shoe the stem projects through the hole of the shoe and into the recess of the brake lining in spaced-apart relation from the recess for defining a cavity within which the conductive pin is housed.

The instant invention has as a further object the provision of a brake wear alert device as set forth in the foregoing paragraphs and wherein a cross pin is provided of conductive material to extend laterally from the periphery of the head of the plug so that the head may be hammered into a snug, nestled position in the hole of the shoe without damage to the conductive portion of the switch and a pigtail conductor having a quick connector device on the distal end provided.

The present invention has as an object the provision of a brake wear alert device system which includes a locator pin and slot to cooperate between the liner and shoe to align the hole of the shoe and the recess of the liner in registry for passage of the plug thereinto.

It is also an object of this invention to provide a brake wear alert device of the type described hereinafter which is simple and inexpensive to manufacture and which is adapted to be readily installed together with a brake lining and including a switch adapted to connect readily to an electrical lead previously supplied in the automobile construction with the said switch being arranged in a recess in the brake lining and adapted to be closed and permit current flow from a source to light indicator means in the cab of a vehicle at a predetermined condition of wear of the brake lining.

In accordance with these and other objects which will become apparent hereinafter, the instant invention will now be described with reference to the accompanying drawings illustrating a preferred embodiment thereof.

In the drawings:

FIGURE 1 is a partial side elevation view in cross section illustrating an installation of the invention in a conventional type of brake shoe and lining;

FIGURE 2 is an enlarged cross-sectional view indicating the modified form of arrangement of the instant invention in the brake lining, shoe and drum arrangement;

FIGURE 3 is an enlarged view of the switch arm and carried conductor and connector means referred to more fully hereinafter;

FIGURE 4 is an electrical diagrammatical view to illustrate the electrical connection of the parts described hereinafter; and FIGURE 5 is a cross-sectional view to illustrate a modified version of the instant invention.

Referring more particularly to the drawings, wherein like reference characters designate like or corresponding parts throughout the different views, and referring particularly to FIGURE 1, the numeral 12 generally indicates a brake drum surface and the numeral 14 indicates a brake shoe with the lining 16 carried on the shoe and adapted to be reciprocally moved into high friction-producing engagement with the drum face. FIGURE 2 illustrates a somewhat modified arrangement of the structure comprising the drum 12′, shoe 14′ and liner 16′ and is of the type often found on large vehicles. It is when the brake lining wears through that a new set of brake linings is required on the vehicle and the instant invention includes electrical means to energize an indicator means in the vehicle cab to function when the linings have reached a predetermined point of wear. The electrical means includes the indicator means 17 such as the lamp, and a normally opened switch composed of an arm secured in the brake lining and shoe in a manner to be described following the description of the structure of the switch arm. Referring to FIGURE 3, the switch arm is seen to comprise a plug 18 having a head 20 and a projecting central stem 22 with the stem side or the underside of the head 23 defining a limit means. The diameter of the stem is such as to be adapted to be driven into a hole 24 through the brake shoe and into a recess 26 in the confronting face 28 of the brake lining to a depth such that the limit means 23 engages the shoe surface and the leading edge 30 of the plug is spaced in the recess in confronting relation but slightly spaced from the recess floor 32. The plug, which is of insulating material, is provided with a central axial bore 33 to snugly nestle a conductor pin 34 to project into the cavity between the recess floor 32 and the leading edge 30 and preferably in spaced-apart relation from the floor. A cross bore 36 is provided to electrically connect the pin 34 of the plug to the periphery of the head and accommodate a flexible conductor or pigtail 42 which is provided on the distal end thereof with a quick connector male member 46 adapted to be received in a female connection 48 on the opposing end of an electrically conductive line 50. For purposes of assembly of the liner and the shoe the face 28 of the liner may be provided with a plurality of locator pimples such as that designated by the numeral 52 which are adapted to be received in a corresponding number of recesses 54 in the confronting shoe face or, alternatively, the pattern in relief may be on the shoe face to bite into depressions provided on the liner surface 28. While dimensions are not critical to this invention, it is often encountered that the thickness of the lining is approximately one-half of an inch and under such circumstances a depth for the recess in the liner of one-sixteenth of an inch has been found to be satisfactory. The indicator means for the cab is preferably a red pilot light although the invention is not to be thus limited and may include an audible signal or a flasher unit 58 to cause the light to blink on and off and attract the attention of the driver. Also, the indicator means 17 is in series, preferably, with the ignition switch 16 which, as is apparent from FIGURE 4, is in series with the source 62 and with a switch of the type described hereinbefore dwelling in a brake lining of each of the wheels of the vehicle and with the switch arms being arranged in parallel between the indicator lamp and ground. The conductive pin may be of any suitable conductive material such as copper, carbon or other type of wire and, in addition to the snug fit of the mating size diameter of the plug relative to that of the hole in the recess, it is preferred that in assembly the stem is dipped in an adhesive or epoxy type of glue material to coat the outer surface of the stem 22 and the surface 23 of the head to securely reinforce and hold the plug in the position shown.

It will thus be apparent that as the brake lining wears to a predetermined minimum thickness, which is approximately one-sixteenth of an inch, the cavity within which the distal end of the conductive pin projects will be opened and further wear of the lining will cause the signal in the vehicle to commence to function warning the driver. As an alternative to the employment of a switch arm in each of the wheels and electrically in parallel with one another, the indicator means may be provided with a wire 66 of substantial length to connect it electrically to a plug of the type described hereinbefore in the brake lining of the vehicle which wears the most as determined from practice so that when this brake lining wears dangerously thin the warning light in the cab of the vehicle will warn the driver that it is time to replace that brake lining and most likely the other brake lining. The same system may be applied to disk brakes, and the instant invention is adapted to be installed and operate in linings which are slightly conductive as is the material of some brake linings, and in those types of brake linings which include certain conductive materials, lacings, or reinforcement. As is apparent in FIGURE 5, it is not necessary to provide a recess in the liner when the stem of the plug is of a length substantially similar to that of the thickness of the shoe and the projecting distal end of the conductive pin is pointed to pierce a predetermined depth into the lining. In this embodiment wear of the brake shoe to a predetermined condition of wear will expose the distal end 61 of the conductive pin to engagement with the brake drum which in turn is grounded. The plug is installed by impacting the head of the plug with a hammer or other similar tool until the limiting means 23 of the plug engages the surface of the shoe and by reason of the axial dimension of the stem the distal end 61 of the conductive pin will have penetrated to the predetermined depth in the confronting face of the liner.

In a preferred embodiment of the invention, the conductor pin which is actually arranged in the plug is provided with an exterior epoxy coating over that length thereof which engages bore walls in the plug. Also, the head of the plug is provided with an indentation or radially extending trough so that the pigtail of the conductor pin will be recessed in the surface of the head in the radially extending trough.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. A brake wear alert device for a vehicle including, a brake drum and a brake shoe with a brake lining carried on the shoe in confronting relation to the brake drum and means to reciprocally move the lining of the shoe into and out of high friction-producing engagement with the shoe; and a switch arm carried in the shoe and lining and including a headed plug having a stem with a central axial bore therethrough and a cross bore in the head and a conductor pin in the axial bore with one end extending outwardly of the distal end of the stem, and a conductor means connected through the cross bore to the conductor pin and having connector means on the remote end thereof with the portion of the conductor means exterior of the plug being insulated; and said shoe having a through hole sized to snugly permit passage of the stem therethrough with the pin projecting into the liner.

2. A device as set forth in claim 1 wherein the liner includes a recess of a cross-sectional area corresponding with that of the cross-sectional area of the hole in the shoe and sized to snugly receive the stem of the plug and the recess extending in the order of one-sixteenth of an inch into the face of the liner confronting the shoe.

3. A device as set forth in claim 2 wherein the said pin projects from the distal end of the stem a distance less than one-sixteenth of an inch.

4. A device as set forth in claim 2 wherein locator means are provided on the confronting faces of the liner and shoe to align the recess and the hole with the cross-sectional areas being cocylindrical and adapted for receipt of said stem.

5. A device as set forth in claim 1 wherein said stem is of a length such as to project through the hole and into the recess of the liner with the distal end of the stem being in spaced-apart relation from the floor of the recess and within the liner recess.

6. A device as set forth in claim 5 wherein the said distal end of the pin is between the distal end of the plug stem and the floor of the recess.

7. A device as set forth in claim 4 wherein the locator means on the confronting face of the liner and shoe comprise a pattern in relief projecting from the liner and into the recesses of the shoe.

8. A device as set forth in claim 1 wherein the said one end of the conductor pin projecting outwardly of the distal end of the stem is pointed to impale the liner.

9. A device as set forth in claim 1 wherein resinous material is provided to coat the outer surface of the stem to assist in holding it to the shoe when in the hole.

References Cited

UNITED STATES PATENTS

| | | | |
|---|---|---|---|
| 2,217,176 | 10/40 | Madison | 200—61.4 |
| 2,731,619 | 1/56 | Fratus | 200—61.4 XR |
| 2,835,757 | 5/58 | Chellemi et al. | 200—61.4 |
| 3,273,116 | 9/66 | Quiros et al. | 340—60 |

ROBERT K. SCHAEFER, *Primary Examiner.*

M. GINSBURG, *Assistant Examiner.*